Nov. 26, 1957
R. PHILLIPS
2,814,363
SAFETY HITCH FOR TRAILERS
Filed Aug. 18, 1954
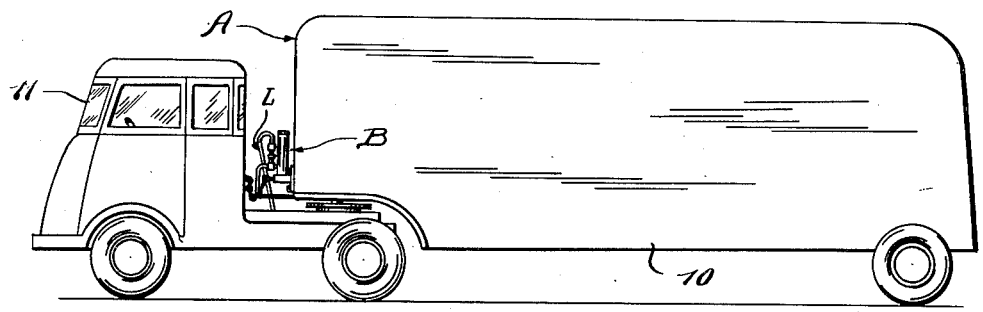
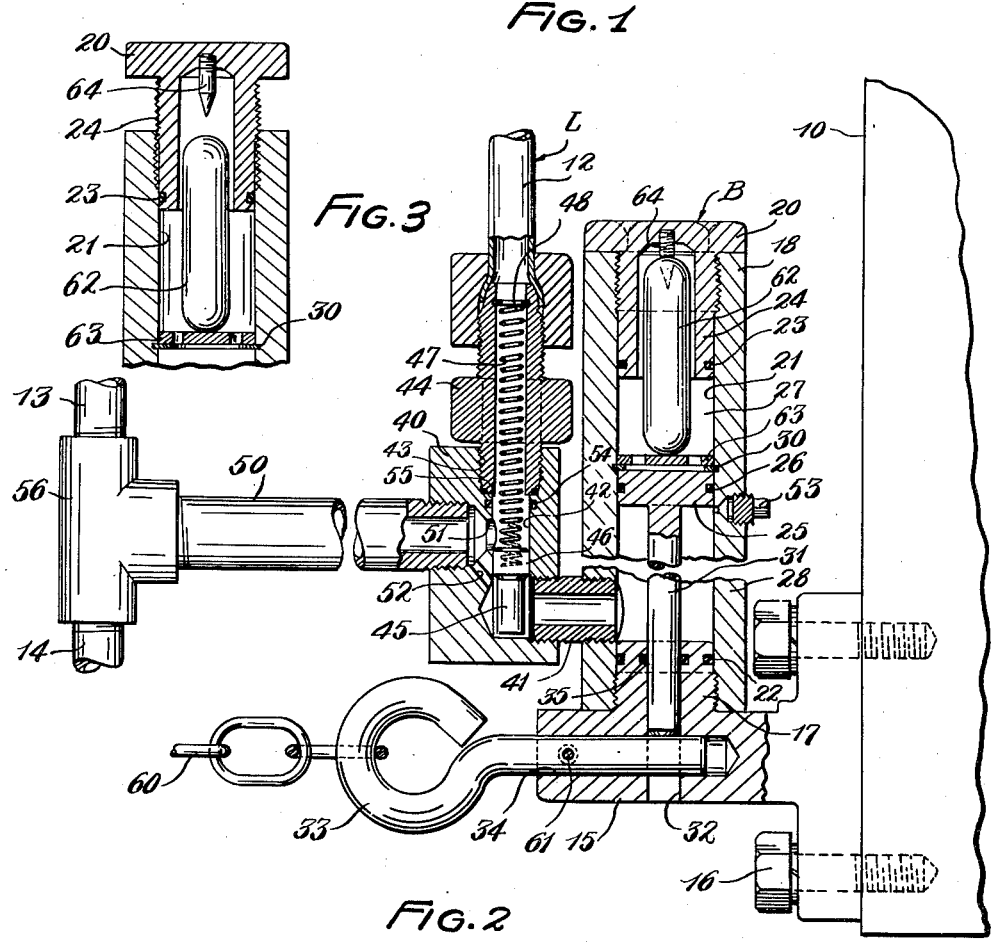
INVENTOR.
ROY PHILLIPS
BY Hudson, Boughton,
Williams, David & Hoffmann
ATTORNEYS United States Patent Office 2,814,363
Patented Nov. 26, 1957

2,814,363
SAFETY HITCH FOR TRAILERS
Roy Phillips, Chagrin Falls, Ohio
Application August 18, 1954, Serial No. 450,735
8 Claims. (Cl. 188—112)

The present invention relates to multi-unit vehicles, for example, truck-trailer and tractor-trailer combination vehicles, in which the trailing unit or units have a braking system preferably controlled from the leading unit, and to braking systems and safety devices for such vehicles whereby the brakes of a trailing unit are applied upon inadvertent separation from a leading unit.

An object of the invention is the provision of a new and improved, multi-unit vehicle of the character referred to, comprising means including a reservoir of pressure fluid located on and confined to a trailing unit, for automatically applying brakes thereof upon accidental separation of the unit from a leading unit of the vehicle.

Still another object of the invention is the provision of a new and improved, multi-unit vehicle of the character referred to, having a braking system comprising a hydraulically operated motor on a trailing unit, which motor is automatically operated upon separation of the unit from a leading unit of the vehicle by a source of fluid pressure located on the trailing unit.

A still further object of the invention is the provision of a new and improved braking system for a multi-unit vehicle of the character referred to, which system utilizes pressure derived from a pressurized fluid reservoir, preferably of the disposable type, located on a trailing unit, to actuate the brakes of said unit upon its inadvertent separation from a leading unit of the vehicle.

A more specific object of the invention is the provision of a new and improved, multi-unit vehicle of the character referred to, comprising a braking system wherein a source of fluid pressure located in a leading unit is interconnected to and normally operates a brake applying, fluid pressure motor in a trailing unit, and wherein a second source of fluid pressure located solely on the trailing unit is released to operate the brake applying, fluid pressure motor upon the accidental separation of the units.

Another more specific object of the invention is the provision of a novel and improved safety device for a multi-unit vehicle having a conventional, hydraulic braking system in which a source of fluid pressure in a leading unit is interconnected to and normally operates a brake applying fluid pressure motor in a trailing unit, said safety device being adapted to be installed in the portion of the hydraulic braking system located in said trailing unit and comprising a source of fluid pressure adapted to be released upon separation of the units and a shut-off valve adapted to close off the line connected to the leading unit upon flow of fluid from said second source of fluid pressure.

The invention resides in certain constructions and combinations and arrangements of parts and further objects and advantages will be apparent to those skilled in the art to which it relates from the following description of the preferred embodiment described with reference to the accompanying drawings forming a part of this specification, in which:

Fig. 1 is a view of a conventional tractor-trailer truck embodying the present invention;

Fig. 2 is an enlarged side elevational view of a portion of Fig. 1 with parts broken away and shown in section to illustrate the internal mechanism; and Fig. 3 is a fragmentary, sectional view of a portion of Fig. 2 showing the parts in a partly disassembled position.

While the present invention is applicable to various types of multi-unit vehicles and to various types of braking systems, it is herein shown as embodied in a tractor-trailer truck A having a hydraulic braking system including brake applying, fluid pressure motors located in the trailing unit or trailer 10 normally operated by means of pressure supplied from a master cylinder. The master cylinder may be located either on the leading or trailing unit, in which latter case an air line or other means is employed to interconnect the controls in the leading unit with the master cylinder to actuate the latter. In the tractor trailer truck shown in the drawing, the master cylinder is located in the tractor 11 and is hydraulically connected to the brake applying fluid pressure motors of the trailer by an interconnecting line L. The brakes of the trailer 10 are normally applied by the depressing of a foot pedal or other lever in the cab of the tractor 11 whereupon pressure produced in the master cylinder or the like is transmitted through the pipe or conduit 12, etc. of the interconnecting line L to branch conduits 13, 14 also of the interconnecting line L to the fluid pressure motors of the trailer, thereby applying its brakes. The brakes are spring-biased to their retracted positions, and upon retraction of the foot pedal lever, the brakes are released, forcing hydraulic fluid back through interconnecting line L to the master cylinder of the tractor, all in a manner well-known in the art.

According to the provision of the present invention, the trailing unit of a multi-unit vehicle is provided with automatic means including a pressure reservoir for causing application of the brakes of the trailing unit upon its accidental separation from a leading unit. In the embodiment shown, this means includes a unit B attached to the trailing unit 10 and connected into the interconnecting, hydraulic fluid line L of the braking system of the vehicle in advance of the brake-applying fluid pressure motors of the trailing unit 10 and having a mechanical connection with the leading unit 11 adapted to trip or actuate the unit in the event the trailing unit 10 becomes accidentally separated from the leading unit 11.

The unit B, as shown in the drawing, includes a base or bracket 15 detachably bolted to the forward end of the trailer 10 by bolts 16 and having a vertically extending, threaded boss 17 projecting from a top, horizontal surface adapted to receive the lower, threaded end of a vertically extending, cylindrical member 18 closed at its upper end by a cap 20 to form a piston chamber 21. The upper end of the boss 17 is of reduced diameter, unthreaded and provided with an external groove within which an O ring type of pressure seal 22 is seated, to prevent the leakage of fluid pressure thereby from the lower end of the piston chamber 21. The cap 20 is similarly constructed and is threaded into the upper end of the cylindrical member or cylinder 18. Escape of fluid pressure thereabout is prevented by an O ring type of pressure seal 23 located in a groove adjacent to the lower end of the unthreaded portion of the downwardly projecting boss 24 of the cap 20.

The cylinder 18 is provided with or houses a piston 25 having a circumferential groove containing an O ring type of pressure seal 26 and which piston divides the piston chamber 21 into upper and lower compartments 27, 28, respectively. Upward movement of the piston 25 beyond a predetermined point is arrested by a snap ring 30 seated in an internal, circumferential groove in the cylinder 18. The piston 25 is normally held in a position adjacent to the snap ring 30 by a piston rod 31 projecting from the lower side of the piston and which extends into an axial hole 32 in the base 15 where it engages a release pin 33 seated in a horizontally extending or transverse hole 34 in the base 15. An O ring type, fluid pressure seal 35 seated in a circular groove formed in the side wall of hole 32 slidingly engages the piston rod 31 and prevents the flow of pressure fluid thereby.

The lower compartment 28 of the piston chamber 21 is connected to the hydraulic braking system of the tractor-trailer vehicle through a member 40 to which it is connected by a pipe nipple 41 threaded into a tapped aperture in the cylinder 18 adjacent to the lower end of the piston chamber 21 and a like aperture in the lower right-hand end of the member 40 as viewed in Fig. 2. The left-hand end of the nipple 41 communicates with an enlarged, lower end of a vertically extending aperture 42 in the member 40, the upper end of which is counterbored and tapped as at 43 for the reception of a fitting 44 to the upper end of which the conduit or pipe 12 of the interconnecting line L is connected. The aperture 42 contains a piston 45 normally located or resting in the lower end thereof, as shown in Fig. 2, and having a head 46 which forms a sliding fit in the aperture. The piston 45 is normally urged in a downward direction by a coil spring 47, the lower end of which engages in a seat in the piston head 46 while the upper end thereof projects upwardly through the aperture 42 and the opening in the fitting 44 to a point adjacent to the upper end of the fitting where it is engaged by a snap ring 48 in the upper end of the fitting.

The vertical aperture 42 in the member 40 is in communication both above and below the piston head 46 when the piston head is in its normal position, that is, the position shown in Fig. 2, with a pipe or nipple 50 threaded into a suitably tapped aperture in the member 40. The pipe or nipple 50 communicates with the aperture 42 above the piston head 46 through an unrestricted, relatively large aperture 51 in the member 40 and below the piston head 46 by a relatively small or restricted aperture 52. The aperture 52, as stated, is of restricted cross-section but provides a means for maintaining that part of the aperture 42 below the piston head 46, the nipple 41 and the lower compartment 28 of the piston chamber 21 full of hydraulic braking fluid from the braking system of the vehicle, that is, fluid in the interconnecting line L. A plug 53 in the wall of the cylinder 18 below the piston 25 when in its normal position, that is, the position shown in Fig. 2, provides means for bleeding air from the lower compartment 28 of the piston chamber to initially fill the same with fluid pressure from the interconnecting line L. An O type seal 54 in the aperture 42 above the conduit 51 cooperates with the piston head 46 of the piston 45 and closes the conduit or connection between the pipe 12 and the pipe or nipple 50 when the piston is moved into engagement with a shoulder 55 formed by the lower end of the fitting 40. As shown, the pipes or conduits 13 and 14 connected to the fluid pressure motors of the trailer unit are connected to the pipe 50 by a pipe T 56.

In those cases where brake applying fluid pressure is normally supplied by a master cylinder securely mounted to a trailing unit in a manner preventing rupture of the line connecting the master cylinder and the brake applying fluid pressure motors upon separation of the trailing unit from its leading unit or units, and which master cylinder contains stop means which limits back flow of hydraulic fluid into the master cylinder to an amount below that required to be delivered by the unit B in order to set the brakes of the trailing unit, a safety shut-off valve similar to that provided by the piston 45 and the aperture 42 will not be required.

When the trailing unit is connected to the leading unit, the release pin 33 is also connected to the leading unit by a chain 60, the construction being such that in the event the units become accidentally separated, the chain 60 will pull the release pin 33 which is normally retained in the position shown in Fig. 2 by a shear pin 61 from underneath the lower end of the piston rod 31, allowing the piston 31 to be forced in a downward direction by gas fluid pressure in the upper compartment 27 of the piston chamber 21. This forces fluid pressure from the lower compartment 28 through the nipple 41 into the lower end of the aperture 42 in the member 40 to raise the piston 45 until the upper end of the head 46 engages the shoulder 55, whereupon the pipe or conduit 12 connected to the leading unit is closed and fluid in the lower compartment 28 of the piston chamber 21 is forced under pressure through the conduit or aperture 51 and the pipe 50, T 56, pipes 13, 14 to the fluid pressure motors of the trailing unit and the brakes thereby applied.

The upper compartment 27 of the piston chamber 21 constitutes a pressure reservoir and may be provided with gas fluid under pressure in any convenient manner. In the embodiment shown, gas pressure is created therein by the use of a pressurized, carbon dioxide cartridge of commercial construction. The cartridge is inserted in the upper compartment 27 by removing the cap 20. Downward movement of the cartridge in the piston chamber 21 is limited by a perforated disk 63 located in the piston chamber 21 above the split ring 30 and normally abutting thereagainst. The cap 20 is provided with a downwardly extending rod or member 64 having a pointed end which is adapted to pierce the cartridge 62 when the cap is replaced, thus releasing the gas within the cartridge, it being understood that before the cap 20 is reapplied to the cylinder 18 and gas pressure released in the upper compartment 28 of the piston chamber 21, the piston 25 should be in the position shown in Fig. 2, with the lower end of the piston rod 31 abutting the release pin 33.

The operation of the device will be apparent from the foregoing description thereof. Suffice it to say that the braking system of the multi-unit vehicle will function in its normal manner until the release pin 33 is withdrawn from underneath the piston rod 31 as in the event of accidental separation of the trailing unit. In this event the gas pressure above the piston 25 will force the piston downwardly, causing the hydraulic fluid therebelow to flow through the nipple 41, raise the piston 45 in the aperture 42 until it closes off the conduit or opening to the pipe 12 connected to the leading unit, which will now be broken. Hydraulic fluid under pressure of the gas in the upper compartment 27 of the piston chamber 21 then flows through aperture 51 and pipe 50, etc. to the fluid pressure motors of the trailer, thereby applying the trailer brakes.

From the foregoing description of the preferred embodiment of the invention, it will be apparent that the objects heretofore enumerated and others have been accomplished. While the preferred embodiment of the invention has been shown and described in detail, the invention is not limited to the particular construction shown and it is my intention to cover hereby all adaptations, modifications and uses thereof which come within the practice of those skilled in the art to which the invention relates and within the scope of the appended claims.

Having thus described my invention, I claim:

1. In a multi-unit vehicle having a trailing unit which can inadvertently become separated from a leading unit, a brake on said trailing unit, a body connected to the trailing unit and having a cylindrical chamber closed at one end, a piston in said chamber, means operatively connected to said body limiting movement of said piston in a direction away from said closed end of said chamber, a cartridge containing gas under pressure in said chamber between its closed end and said piston, means for piercing said cartridge when said cartridge is in place in said chamber, means operated by said piston to apply said brake of the trailing unit, and means connected to the leading unit for rendering said first-mentioned means inoperative upon separation of the units.

2. In a multi-unit vehicle of the type wherein a brake-applying hydraulic fluid pressure motor in a trailing unit is connected to and operated by a pressure source in a leading unit and wherein the units are separable, a body connected to the trailing unit and having a cylindrical chamber closed at one end, a piston in said chamber, means yieldably urging said piston toward said closed end of said chamber, means operatively connected to said body and preventing movement of said piston toward said end of said chamber, conduit means connecting said end of said cylindrical chamber with the hydraulic fluid pressure motor of the trailing unit and with the pressure source in the leading unit, means connected to the leading unit for rendering said second-mentioned means inoperative upon separation of said units, and valve means in said conduit means adapted to close off the portion thereof leading to the leading unit upon separation of said units.

3. In a multi-unit vehicle whose units are separable and which has a brake-applying fluid pressure motor in a trailing unit normally operated by a pressure source in the leading unit, a member connected to the trailing unit and having a closed cylindrical chamber, a piston in said chamber dividing said chamber into first and second end portions, means operatively connected to said member and limiting movement of said piston into the first end portion of said chamber, means for supplying gas under pressure to the second end portion of said cylinder, a valve body having a cylindrical valve chamber and having a first port at one end of said valve chamber, means communicating between the pressure source of the leading unit and said first port, said valve chamber having a second port spaced from said first port and connected to said first portion of said cylindrical chamber in said chamber, said valve chamber having a third port communicating with the fluid pressure motor of the trailing unit, means for closing said first port upon a flow of fluid in said valve chamber from said second port toward said third port, and means connected to the leading unit for rendering said first-mentioned means inoperative upon separation of the units.

4. In a multi-unit vehicle whose units are separable and which has a brake-applying fluid pressure motor in a trailing unit normally operated by a pressure source in the leading unit, a braking system comprising a member connected to the trailing unit and having a cylindrical chamber open at one end, a removable cover member for sealing the open end of said chamber, a piston in said chamber dividing said chamber into first and second end portions, an axially extending rod on said piston and projecting into said first portion of said chamber, means engaging the end of said rod limiting movement of said rod, said second end portion of said chamber receiving a cartridge containing gas under pressure, means for piercing a cartridge in said second end portion of said chamber when said cover member is in sealing engagement with the end of said chamber, a valve body having a valve chamber and a first port at one end of said valve chamber, means communicating between the pressure source of the leading unit and said first port, said valve body having a second port in said valve chamber spaced from said first port and connected to said first portion of said chamber in said member, said valve body having a third port in said valve chamber communicating with the fluid pressure motor of the trailing unit, means for closing said first port upon a flow of fluid from said second port to said third port, and means connected to the leading unit for rendering said first-mentioned means inoperative upon separation of the units.

5. A braking system of the type wherein a brake-applying fluid pressure motor in a trailing unit of a multi-unit vehicle is connected and operated by a pressure source in the leading unit of said vehicle, said system comprising a member connected to the trailing unit and having a cylindrical chamber, a removable cover adapted to seal one end of said chamber, a piston in said chamber dividing said chamber into first and second end portions, means operatively connected to said member and preventing movement of said piston into the first end portion of said chamber, said second end portion of said chamber receiving a cartridge containing gas under pressure, means for piercing a cartridge in said second end portion of said chamber when said cover is in sealing engagement with the end of said chamber, conduit means connecting the first end portion of said cylindrical chamber with the fluid pressure motor of the trailing unit and with the pressure source in the leading unit, means for connection to a leading unit for rendering said first-mentioned means inoperative upon separation of said trailing unit from a leading unit, and valve means in said conduit means for closing off the portion thereof leading to the leading unit upon separation of the trailing unit from a leading unit.

6. A safety unit for installation on a trailing unit of a multi-unit vehicle having a braking system of the type wherein a brake-applying fluid pressure motor in a trailing unit of the vehicle is interconnected with and operated by a hydraulic master cylinder in the leading unit of said vehicle, said unit comprising a member adapted to be connected to the trailing unit and having a chamber, a piston in said chamber, means operatively connected to said body limiting movement of said piston in a direction away from said closed end, means for supplying gas under pressure to the portion of said chamber between the piston and the closed end of the chamber, means adapted to be operated by said piston to apply said brake means on the trailing unit, and means adapted to be connected to a leading unit for rendering said first-mentioned means inoperative upon separation of the units.

7. A safety unit for installation on a trailing unit of a multi-unit vehicle having a braking system of the type wherein a brake-applying fluid pressure motor in a trailing unit of the vehicle is interconnected with and operated by a hydraulic master cylinder in the leading unit of said vehicle, said unit comprising a member adapted to be connected to the trailing unit and having a chamber, a piston in said chamber, means operatively connected to said body limiting movement of said piston in a direction away from said closed end of said chamber, a cartridge containing gas under pressure in said chamber between its closed end and said piston, means for piercing said cartridge when said cartridge is in place in said chamber, means adapted to be operated by said piston to apply said brake of the trailing unit, and means adapted to be connected to the leading unit for rendering said first-mentioned means inoperative upon separation of the units.

8. A safety unit for installation on a trailing unit of a multi-unit vehicle having a braking system of the type wherein a brake-applying fluid pressure motor in a trailing unit of the vehicle is interconnected with and operated by a hydraulic master cylinder in the leading unit of said vehicle, said unit comprising a member adapted to be connected to the trailing unit and having a chamber, a movable cover for said chamber threadably engaging said member, said cover having a cylindrical projection adapted to seal off the end of said chamber as said cover member is screwed into place, a piston in said chamber dividing said chamber into first and second end portions, means operatively connected to said member and preventing movement of said piston into the first end portion of said chamber, said second end portion being adapted to receive a cartridge containing gas under pressure, a piercing pin on said cover adapted to pierce said cartridge while said projection seals said chamber and said cover is being screwed into place, conduit means adapted to connect the first end portion of said chamber with said fluid pressure motor of the trailing unit, and means adapted to be connected to the leading unit for rendering said first-mentioned means inoperative upon separation of said units.

References Cited in the file of this patent

UNITED STATES PATENTS

| | | |
|---|---|---|
| 2,160,747 | Mayer et al. | May 30, 1939 |
| 2,631,691 | Fitch | Mar. 17, 1953 |
| 2,636,576 | Affleck | Apr. 28, 1953 |